United States Patent

Tseng

[11] Patent Number: 6,059,083
[45] Date of Patent: May 9, 2000

[54] RATCHET MECHANISM

[76] Inventor: Hung Kui Tseng, P.O. Box 63-99, Taichung 406, Taiwan

[21] Appl. No.: 09/306,659

[22] Filed: May 5, 1999

[51] Int. Cl.⁷ .................................................. F16D 11/06
[52] U.S. Cl. ............................................. 192/43.1; 81/62
[58] Field of Search ..................... 192/41 R, 43, 192/43.1; 81/62, 61, 63.1

[56] References Cited

U.S. PATENT DOCUMENTS

| | | | |
|---|---|---|---|
| 593,157 | 11/1897 | Furbish . | |
| 4,290,328 | 9/1981 | Clark | 81/62 |
| 5,174,176 | 12/1992 | Krivec | 81/62 X |
| 5,613,585 | 3/1997 | Tiede | 81/62 X |
| 5,619,891 | 4/1997 | Tiede | 81/62 |
| 5,622,089 | 4/1997 | Gifford, Sr. | 81/62 |
| 5,647,252 | 7/1997 | Miner | 81/62 |
| 5,749,272 | 5/1998 | Phan | 81/62 |
| 5,832,791 | 11/1998 | Lin | 81/62 |
| 5,873,288 | 2/1999 | Gauthier et al. | 81/62 |

Primary Examiner—Charles A Marmor
Assistant Examiner—Saúl Rodríguez

[57] ABSTRACT

A ratchet mechanism includes a ratchet gear rotatably received in a tool member. The tool member includes a cusp, and a spring blade engaged on the cusp. A pair of pawls are supported on the spring blade for engaging with the ratchet gear. The spring blade may bias one of the pawls to engage with the ratchet gear and to disengage the other pawl from the ratchet gear. An actuator is rotatably secured in the tool member and includes two actuating surfaces for disengaging the pawls from the ratchet gear and for effectively driving the tool member.

9 Claims, 3 Drawing Sheets

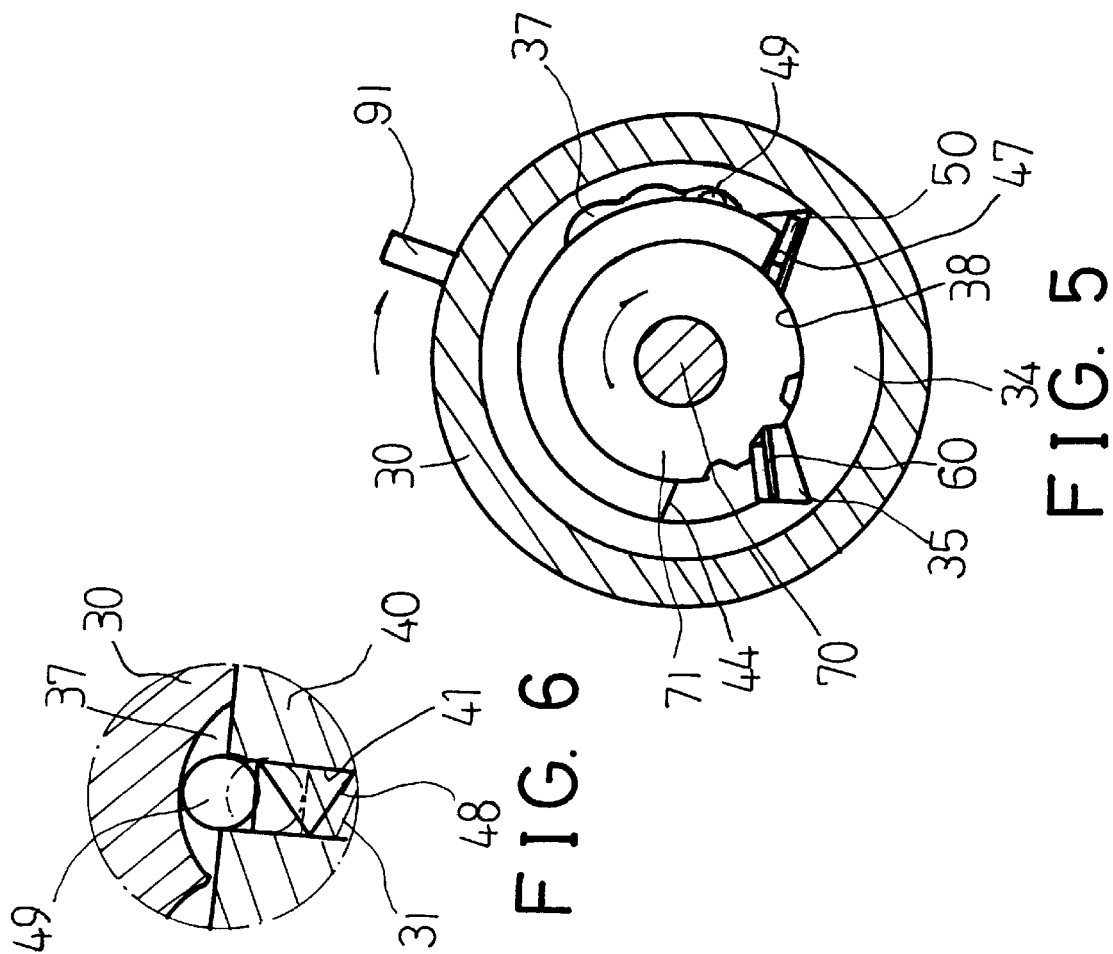
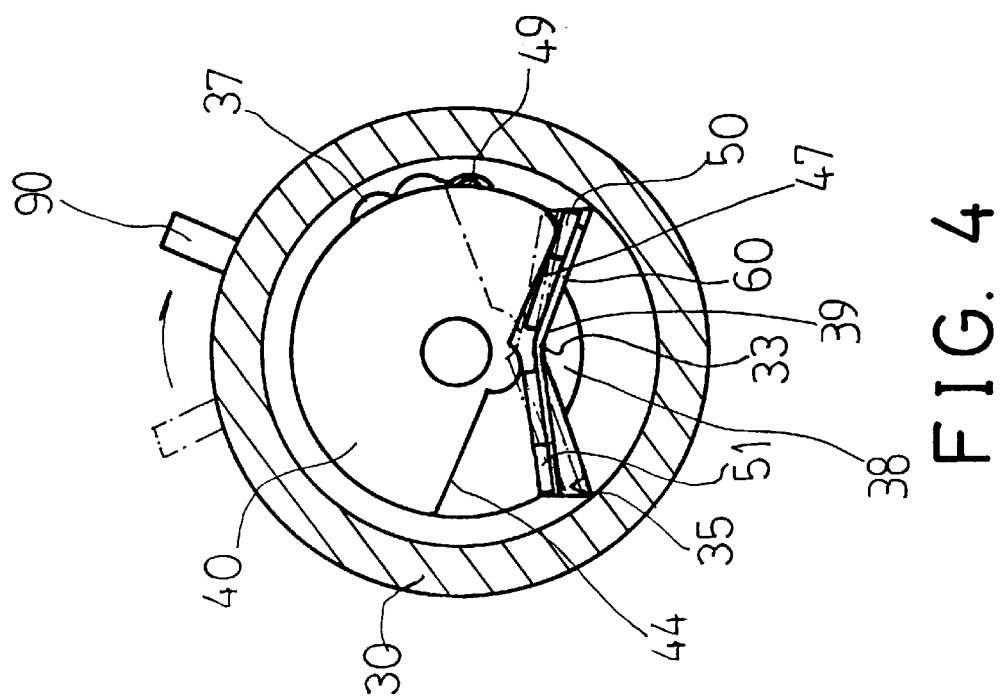

RATCHET MECHANISM

BACKGROUND OF THE INVENTION

1. Field of the Invention

The present invention relates to a ratchet mechanism, and more particularly to a ratchet mechanism for a screw driver or a wrench.

2. Description of the Prior Art

Two typical ratchet mechanisms are disclosed in U.S. Pat. No. 593,157 to Furbish, and U.S. Pat. No. 5,687,820 to Lin, and comprise a ratchet gear rotatably received in a body, and a pair of pawls biased to engage with the ratchet gear. The ratchet mechanisms comprise an actuator for disengaging either or both of the pawls from the ratchet gear and for controlling the driving directions of the tool. However, the actuator may not be used for effectively actuating the pawls to engage with the ratchet gear.

The present invention has arisen to mitigate and/or obviate the afore-described disadvantages of the conventional ratchet mechanisms.

SUMMARY OF THE INVENTION

The primary objective of the present invention is to provide a ratchet mechanism including an actuator that may be used for solidly forcing the pawls to engage with the ratchet gear.

In accordance with one aspect of the invention, there is provided a ratchet mechanism comprising a tool body, a ratchet gear rotatably received in the tool body at a pivot shaft, a pair of pawls supported in the tool body and each including a leg for engaging with the ratchet gear, and means for biasing the leg of a first of the pawls being biased to engage with the ratchet gear and to disengage the leg of a second of the pawls from the ratchet gear, and the biasing means being provided for biasing the leg of the second pawl to engage with the ratchet gear and to disengage the leg of the first pawl from the ratchet gear.

The tool body includes a cusp extended inward thereof, the biasing means includes a spring blade engaged on the cusp, the pawls are engaged with the spring blade. The tool body includes a sector member extended inward of the tool body and having the cusp extended therefrom.

An actuator is rotatably secured in the tool body and includes two actuating surfaces for engaging with the pawls respectively. The actuator includes a bulge extended therefrom for engaging with the pawls respectively.

A handle is further secured to the actuator for rotating the actuator and for forcing the actuating surfaces of the actuator to engage with the pawls. The tool body includes a groove formed therein, the handle includes an extension extended inward of the tool body through the groove of the tool body and secured to the actuator for rotating the actuator.

A positioning device is further provided for positioning the actuator to the tool body. The tool body includes at least two recesses formed therein, the actuator includes a spring-biased projection for engaging with either of the at least two recesses and for securing the actuator to the tool body.

Further objectives and advantages of the present invention will become apparent from a careful reading of a detailed description provided hereinbelow, with appropriate reference to accompanying drawings.

BRIEF DESCRIPTION OF THE DRAWINGS

FIG. 4 is a cross sectional view similar to FIG. 3, illustrating the operation of the ratchet mechanism;

FIG. 5 is a cross sectional view taken along lines 5—5 of FIG. 2; and

FIG. 6 is an enlarged partial cross sectional view illustrating a positioning device for the ratchet mechanism.

DETAILED DESCRIPTION OF THE PREFERRED EMBODIMENT

Figure 1:
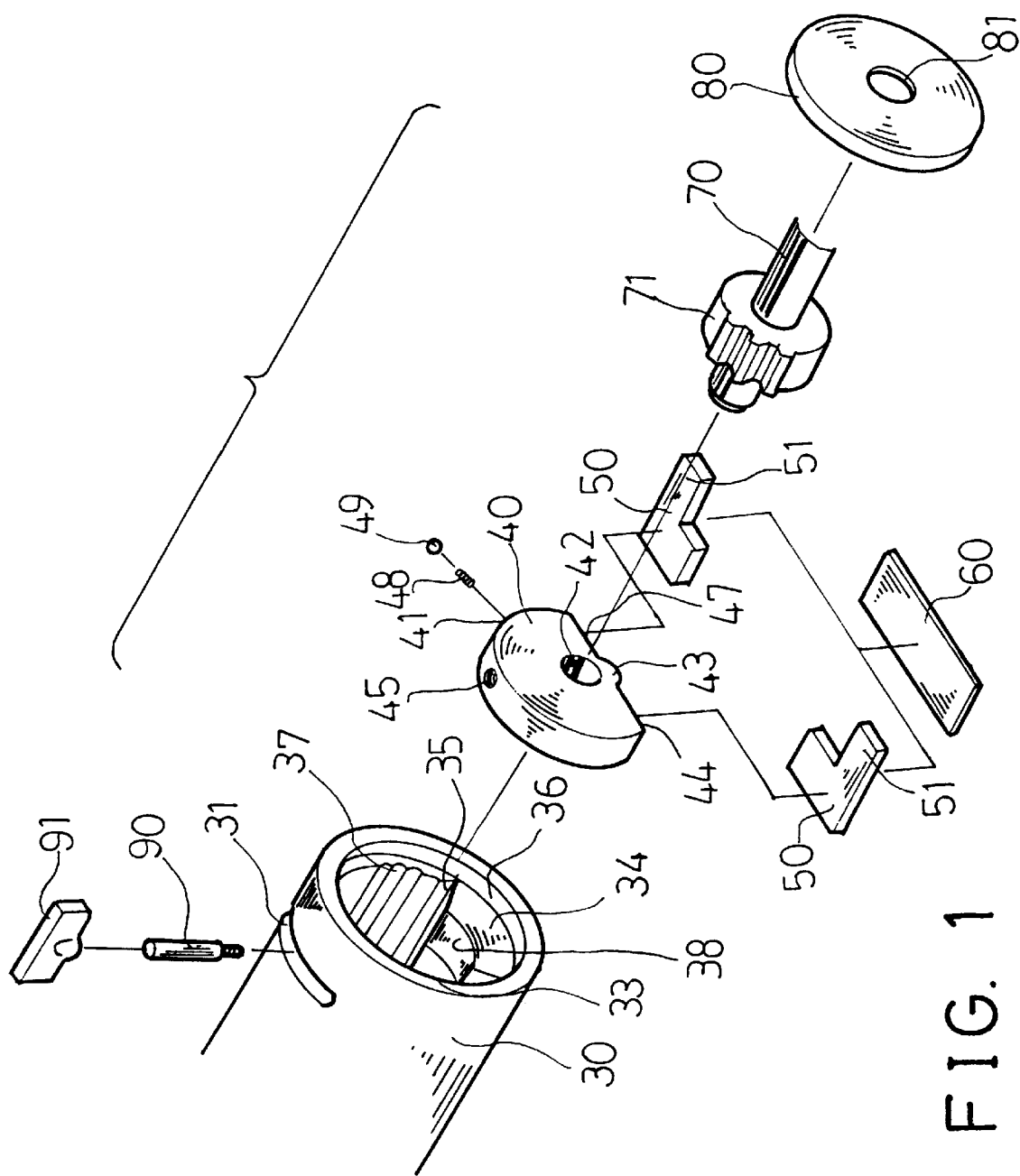
FIG. 1 is an exploded view of a ratchet mechanism in accordance with the present invention.
Figure 2:
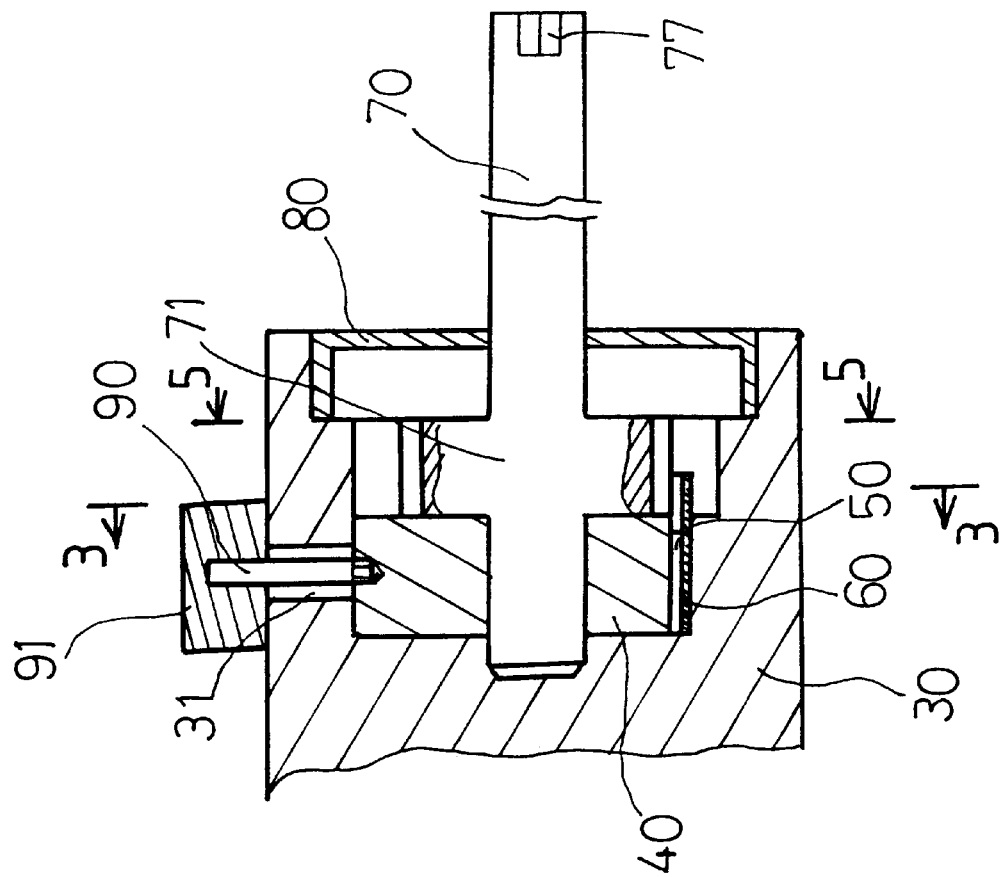
FIG. 2 is a cross sectional view taken along lines 2—2 of FIG. 3.
Figure 3:
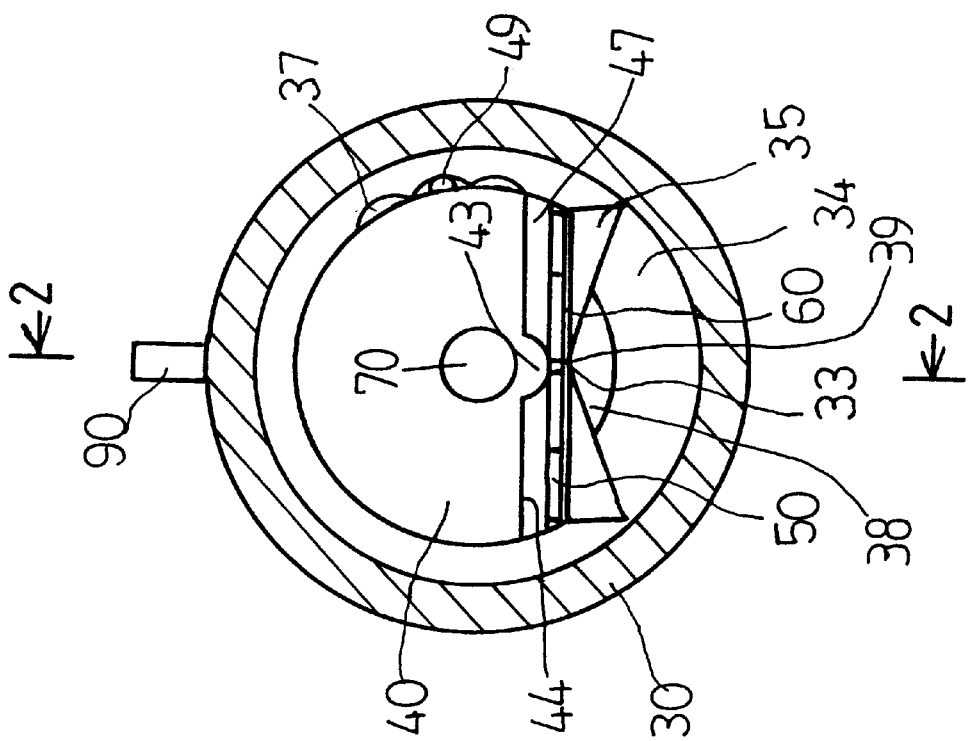
FIG. 3 is a cross sectional view taken along lines 3—3 of FIG. 2.

Referring to the drawings, and initially to FIGS. 1–3, a ratchet mechanism in accordance with the present invention comprises a tool body 30 including a groove 31 laterally formed in one end thereof and including two or more recesses 37 formed in the inner peripheral surface thereof. A sector member 33 is extended inward of the tool body 30 and defined by two notches 35 and includes a cusp 39 (FIG. 3) formed thereon. The sector member 33 includes an outer portion 34 having a curved depression 38 formed therein for rotatably receiving and supporting a ratchet gear 71. The ratchet gear 71 is secured on a shaft 70. A cap 80 is secured in an annular shoulder 36 of the tool body 30 and has a hole 81 for rotatably receiving the shaft 70 and for stably supporting the shaft 70 in place.

A spring blade 60 has a middle portion engaged on the cusp 39 of the sector member 33 (FIGS. 3, 4). Two pawls 50 are disposed on the spring blade 60 and each includes a leg 51 extended therefrom for engaging with the ratchet gear 71 (FIGS. 2, 5). An actuator 40 is rotatably received in the tool body 30 and includes a hole 42 for receiving the shaft 70 and for allowing the actuator 40 to be rotatably and stably supported in the tool body 30. The actuator 40 includes a curved bulge 43 extended from a center portion thereof for engaging with either of the pawls 50 and includes two actuating surfaces 44, 47 for engaging with and for forcing either of the pawls 50 to engage with the ratchet gear 70 (FIGS. 4, 5). The actuator 40 includes a screw hole 45 formed in the peripheral portion thereof distal to the bulge 43 of the actuator 40, and includes a cavity 41 formed therein for receiving a spring 48 and a ball 49 which form a spring-biased projection for engaging with either of the recesses 37 of the tool body 30 (FIGS. 3–6) and for positioning the actuator 40 to the tool body 30 at the required angular position. A handle 91 is secured to an extension 90 which is threaded to the screw hole 45 of the actuator 40 for allowing the handle 91 to rotate the actuator 40 to actuate the pawls 50.

In operation, as shown in FIG. 3, when the bulge 43 of the actuator 40 is engaged with the adjacent portions of the pawls 50 and when the actuating surfaces 44, 47 are not engaged with the pawls 50, both of the pawls 50 may be biased and disengaged from the ratchet gear 71 by the spring blade 60. As shown in FIGS. 4 and 5, when the actuator 40 is rotated by the handle 91 and when the actuating surface 47 of the actuator 40 is depressed against one of the pawls 50 for disengaging the leg 51 of the pawl 50 from the ratchet gear 71, the leg 51 of the other pawl 50 may be forced to engage with the ratchet gear 71 by the spring blade 60 (FIG. 5), such that the ratchet gear 71 and thus the shaft 70 may be driven to rotate in an active direction by the tool body 30 and may rotate freely relative to the tool body 30 in a reverse direction. The shaft 70 includes an engaging hole 77 (FIG. 2) formed in an outer end thereof for engaging with a tool bit or a tool extension or a fastener. On the contrary, when the other actuating surface 44 of the actuator 40 forces the other pawl 50 away from the ratchet gear 71, the pawl 50 that is previously disengaged from the ratchet gear 71 may then be forced to engage with the ratchet gear 71, such that the shaft 70 may be driven in the reverse direction by the tool body 30.

Accordingly, the ratchet mechanism in accordance with the present invention includes an actuator that may be used for effectively forcing the pawls to engage with the ratchet gear.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A ratchet mechanism comprising:

a tool body, a ratchet gear rotatably received in said tool body at a pivot shaft, a pair of pawls supported in said tool body and each including a leg for engaging with said ratchet gear, and means for biasing said leg of a first of said pawls being biased to engage with said ratchet gear and to disengage said leg of a second of said pawls from said ratchet gear, and said biasing means being provided for biasing said leg of said second pawl to engage with said ratchet gear and to disengage said leg of said first pawl from said ratchet gear, wherein said tool body includes a cusp extended inward thereof, said biasing means includes a spring blade engaged on said cusp, said pawls are engaged with said spring blade.

2. The ratchet mechanism according to claim 1, wherein said tool body includes a sector member extended inward of said tool body and having said cusp extended therefrom.

3. The ratchet mechanism according to claim 1 further comprising an actuator rotatably secured in said tool body and including two actuating surfaces for engaging with said pawls respectively.

4. The ratchet mechanism according to claim 3, wherein said actuator includes a bulge extended therefrom for engaging with said pawls respectively.

5. The ratchet mechanism according to claim 3 further comprising means for rotating said actuator.

6. The ratchet mechanism according to claim 3 further comprising a handle secured to said actuator for rotating said actuator and for forcing said actuating surfaces of said actuator to engage with said pawls.

7. The ratchet mechanism according to claim 6, wherein said tool body includes a groove formed therein, said handle includes an extension extended inward of said tool body through said groove of said tool body and secured to said actuator for rotating said actuator.

8. The ratchet mechanism according to claim 3 further comprising means for positioning said actuator to said tool body.

9. The ratchet mechanism according to claim 8, wherein said tool body includes at least two recesses formed therein, said actuator includes a spring-biased projection for engaging with either of said at least two recesses and for securing said actuator to said tool body.

* * * * *